United States Patent
Sweeney (10) Patent No.: US 7,735,061 B2
(45) Date of Patent: Jun. 8, 2010

(54) EFFICIENT ENCODING AND ACCESS OF MATHEMATICALLY PRECISE VARIABLE PRECISION NUMERIC TYPES

(75) Inventor: Timothy Dean Sweeney, Cary, NC (US)

(73) Assignee: Epic Games, Inc., Cary, NC (US)

( * ) Notice: Subject to any disclaimer, the term of this patent is extended or adjusted under 35 U.S.C. 154(b) by 1039 days.

(21) Appl. No.: 11/381,430

(22) Filed: May 3, 2006

(65) Prior Publication Data

US 2007/0260666 A1     Nov. 8, 2007

(51) Int. Cl.
G06F 9/44 (2006.01)
G06F 9/45 (2006.01)

(52) U.S. Cl. .................. 717/114; 717/118; 711/108
(58) Field of Classification Search ......... 717/114–119, 717/124–126, 137; 711/108, 170
See application file for complete search history.

(56) References Cited

U.S. PATENT DOCUMENTS

| | | | |
|---|---|---|---|
| 5,487,158 A | 1/1996 | Amelina et al. | |
| 5,740,404 A * | 4/1998 | Baji | 711/167 |
| 5,802,373 A | 9/1998 | Yates et al. | |
| 5,835,774 A | 11/1998 | Caldwell | |
| 6,076,141 A * | 6/2000 | Tremblay et al. | 711/108 |
| 6,081,665 A * | 6/2000 | Nilsen et al. | 717/116 |
| 6,115,782 A * | 9/2000 | Wolczko et al. | 711/100 |
| 6,298,477 B1 | 10/2001 | Kessler | |
| 6,307,557 B1 * | 10/2001 | Deering | 345/428 |
| 6,317,869 B1 * | 11/2001 | Adl-Tabatabai et al. | 717/132 |
| 6,389,590 B1 | 5/2002 | Miller et al. | |
| 6,425,124 B1 | 7/2002 | Tominaga et al. | |
| 6,457,112 B2 | 9/2002 | Hostetter | |
| 6,522,327 B2 * | 2/2003 | Deering | 345/428 |
| 6,625,797 B1 * | 9/2003 | Edwards et al. | 716/18 |
| 6,760,825 B1 | 7/2004 | Sexton et al. | |
| 6,779,006 B1 * | 8/2004 | Walster et al. | 708/200 |
| 6,836,879 B1 * | 12/2004 | Myers | 717/116 |
| 6,839,822 B2 | 1/2005 | Knippel et al. | |
| 6,850,990 B1 | 2/2005 | Howarth et al. | |
| 6,934,809 B2 | 8/2005 | Tremblay et al. | |
| 6,970,985 B2 | 11/2005 | Moritz | |
| 7,039,908 B2 * | 5/2006 | Steensgaard | 717/151 |
| 7,065,747 B2 * | 6/2006 | Sokolov et al. | 717/126 |
| 7,133,963 B2 * | 11/2006 | Gilfix et al. | 711/108 |
| 7,165,239 B2 * | 1/2007 | Hejlsberg et al. | 717/114 |
| 7,200,837 B2 * | 4/2007 | Stevens | 717/114 |
| 7,516,446 B2 * | 4/2009 | Choi et al. | 717/128 |
| 2003/0084263 A1 | 5/2003 | Knippel et al. | |
| 2003/0177298 A1 | 9/2003 | Kaiser | |

(Continued)

OTHER PUBLICATIONS

Kim et al, "Long term flow fairness with fixed memory space", IEEE, col. 13, No. 2, pp. 998-1000, 2009.*

(Continued)

*Primary Examiner*—Anil Khatri
(74) *Attorney, Agent, or Firm*—Hunton & Williams, LLP (57) ABSTRACT

A method of encoding variable-precision numeric types that includes determining a fixed numeric storage size used by a computer system, encoding numeric values that do not fit into the fixed size in a variable-precision numeric value allocated on a program heap and generating a reference to point to the variable-precision numeric value on the program heap.

23 Claims, 5 Drawing Sheets

U.S. PATENT DOCUMENTS

2005/0246697 A1 11/2005 Hsieh et al.
2006/0010303 A1 1/2006 Wu et al.

OTHER PUBLICATIONS

Sun et al, "Fuzziness of generalized varibale precision rough sets", IEEE, pp. 614-617, 2008.*

Aghaghiri et al, "Reducing transitions on memory buses using sector based encoding technique", ACM ISLPED, pp. 190-195, 2002.*

Neuberger et al, "A multiple bit upset tolerant SRAM memory", ACM Trans. on Design Automation of Electronic System, vol. 8, No. 4, pp. 577-590, 2003.*

* cited by examiner

EFFICIENT ENCODING AND ACCESS OF MATHEMATICALLY PRECISE VARIABLE PRECISION NUMERIC TYPES

FIELD OF THE INVENTION

Embodiments of the present invention relate to encoding and using variable-precision numeric types in a programming language and runtime environment.

BACKGROUND OF THE INVENTION

Programming languages currently feature a wide variety of fixed size numeric types (ex. 8 bit unsigned integers and 32 bit signed integers) and operations on those types. These types and operations frequently correspond to the types and operations supported in hardware on the underlying computer architecture. These fixed size numeric types contain approximations of numeric values. The fixed size numeric types support arithmetic which is deterministic but their approximations are inadequate for precise number-theoretic operations. Libraries are available for many languages to support variable-precision numeric types so that precise operations can be performed on unbounded numeric values. These libraries support a precision adequate for precise number-theoretic operations, but these libraries typically incur a significant performance penalty.

These and other drawbacks exist with current systems.

SUMMARY OF THE INVENTION

One embodiment of the present invention relates to a software module for encoding variable-precision numeric types that comprises executable code for determining a fixed numeric storage size used by a computer system, executable code for encoding numeric values within a bounded range into a single fixed-size memory location, executable code for encoding numeric values that do not fit into the fixed size in a variable-precision numeric value allocated on a program heap, and executable code for generating a reference to access the variable-precision numeric value on the program heap.

Other embodiments may be considered.

DETAILED DESCRIPTION OF EXEMPLARY EMBODIMENT(S)

Exemplary embodiments of the invention are discussed in detail below. While specific exemplary embodiments are discussed, it should be understood that this is done for illustration purposes only. A person skilled in the relevant art will recognize that other components and configuration can be used without departing from the spirit and scope of the invention.

Various embodiments discussed herein overcome the problems of existing software languages by providing one or more of the following elements: A module for encoding precise variable-precision numeric types which determines a fixed numeric storage size used by a computer system, encodes numeric values that do not fit into the fixed size in a precise variable-precision numeric value allocated on a program heap and generates a reference to access the precise variable-precision numeric value on the program heap.

Some of the terminology used herein may be understood as follows:

Fixed size numeric types may be understood to be a numeric type whose bounds are constrained by a limitation in the implementation of the type. In some embodiments this limitation may be due to a limitation of the underlying computer architecture to address memory (e.g. 32-bit architecture, 16-bit architecture).

Variable precision numeric types may be understood to be numeric types whose bounds are constrained only by available memory.

Mantissa precision may be understood to be the coefficient of a floating point number that contains the significant digits.

Fractional precision may be understood to be amount of precision specified by the exponent of the floating point number.

Specified statically may be understood to be specifying a value in program code such that it is fixed after compile time.

Static analysis may be understood to be analysis of the program code without executing the program code.

Figure 1:
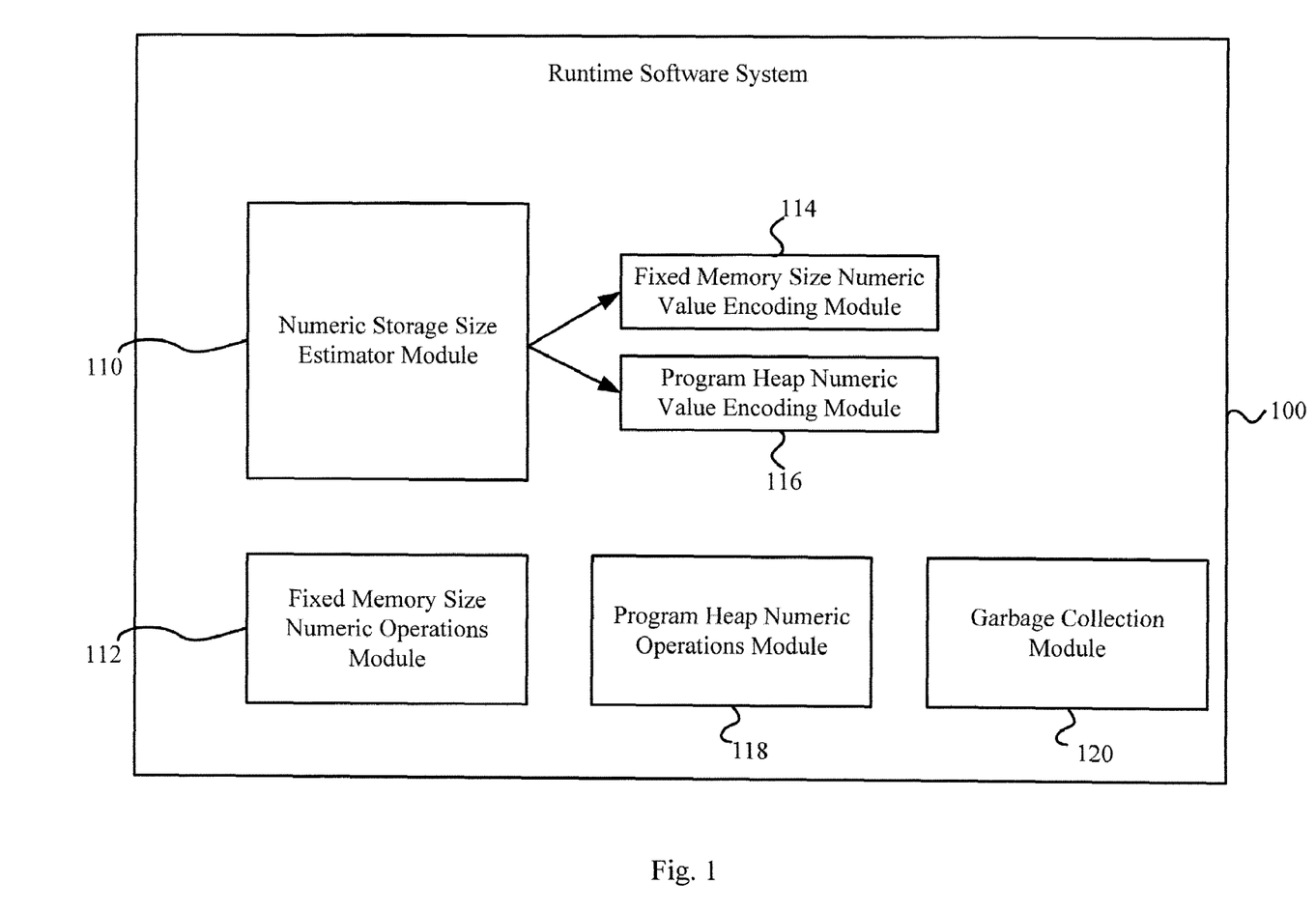
FIG. 1 depicts a schematic diagram of a runtime software system according to an embodiment of the present invention.

FIG. 1 depicts a system for encoding variable-precision numeric types according to one embodiment of the present invention. System 100 may comprise one or more of the following modules: numeric storage size estimator module 110, fixed memory size numeric operations module 112, fixed memory size numeric value encoding module 114, program heap numeric value encoding module 116, program heap numeric operations module 118 and garbage collection module 120.

Numeric storage size estimator module 110 may enable the determination of the fixed numeric storage size used by the computer system and the determination of whether a numeric value fits into the fixed size memory cell. In some embodiments this may be performed by the runtime software using static analysis. In some embodiments this may be implemented in a programming language whose type system encodes numeric bounds information into types and the runtime software utilizes the bounds information in the type to determine whether a numeric value fits into the fixed size memory cell.

Fixed memory size numeric operations module 112 may enable numeric operations for values stored in a fixed size memory cell. In some embodiments this may include efficiently operating directly on the values without allocating additional storage.

Fixed memory size numeric value encoding module 114 may enable encoding of numeric values which may be stored in fixed size memory cell.

Program heap numeric value encoding module 116 may enable encoding numeric values that do not fit into a fixed size memory cell in a variable-precision numeric value allocated on a program heap and generate a reference to access the variable-precision numeric value on the program heap.

Program heap numeric operations module 118 may enable precise variable-precision arithmetic operations utilizing references for operations whose results do not fit into the fixed size memory cell.

Garbage collection module 120 may enable garbage collection to automatically reclaim memory allocated for variable-precision values.

Figure 2:
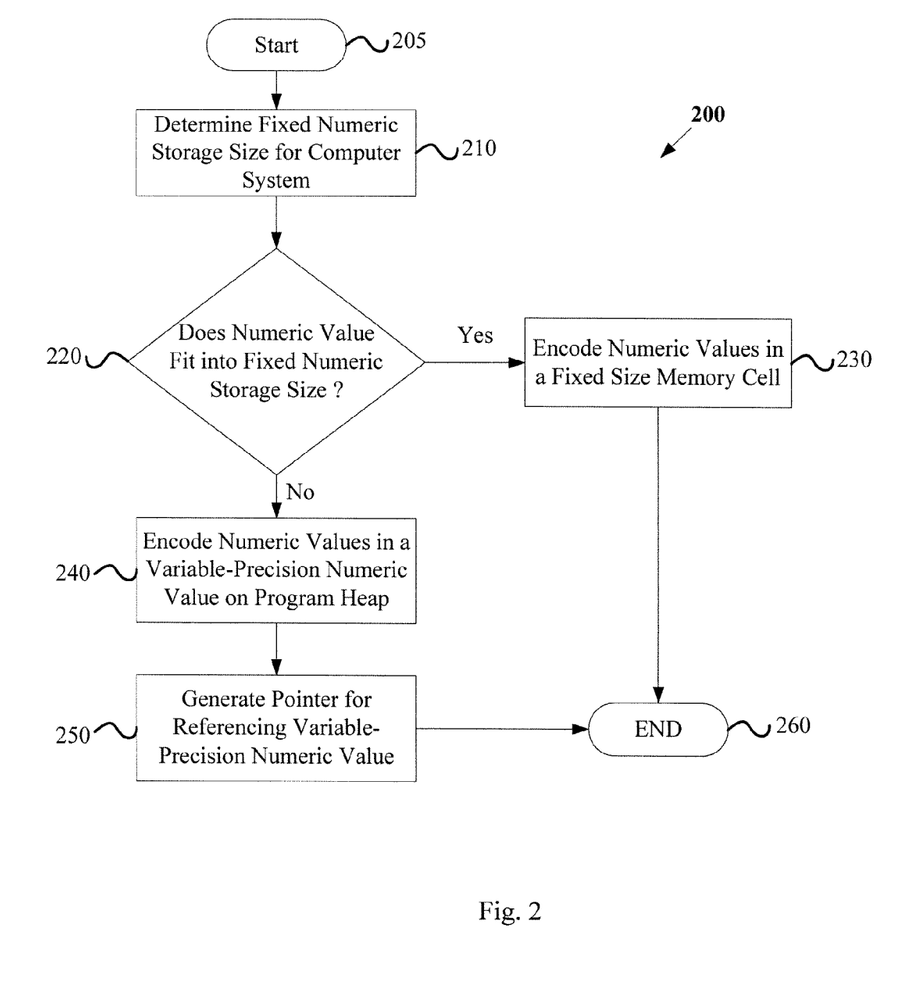
FIG. 2 depicts an optional methodology according to various embodiments of the present invention.

According to an embodiment of the present invention, FIG. 2 illustrates a flow chart 200 showing an exemplary method for determining what the fixed numeric storage size is for a computer system, determining whether a numeric value fits into the fixed numeric storage size, encoding the numeric value in a fixed size memory cell if it fits, encoding the numeric value in a variable-precision numeric value on the program heap and generating a references for accessing the variable-precision numeric value. According to one or more embodiments flow chart 200 may begin at block 205. At block 210 runtime software may determine the fixed numeric storage size for the computer. Block 220 determines whether the numeric value fits into the fixed numeric storage size. If the numeric value fits in the fixed storage size block 230 may encode it there. If the numeric value does not fit in the fixed numeric storage size, block 240 may encode it in a variable-precision numeric value on the program heap. A reference may be generated by block 250 to reference the allocated variable-precision numeric value on the heap. The flowchart ends at block 260.

Figure 3:
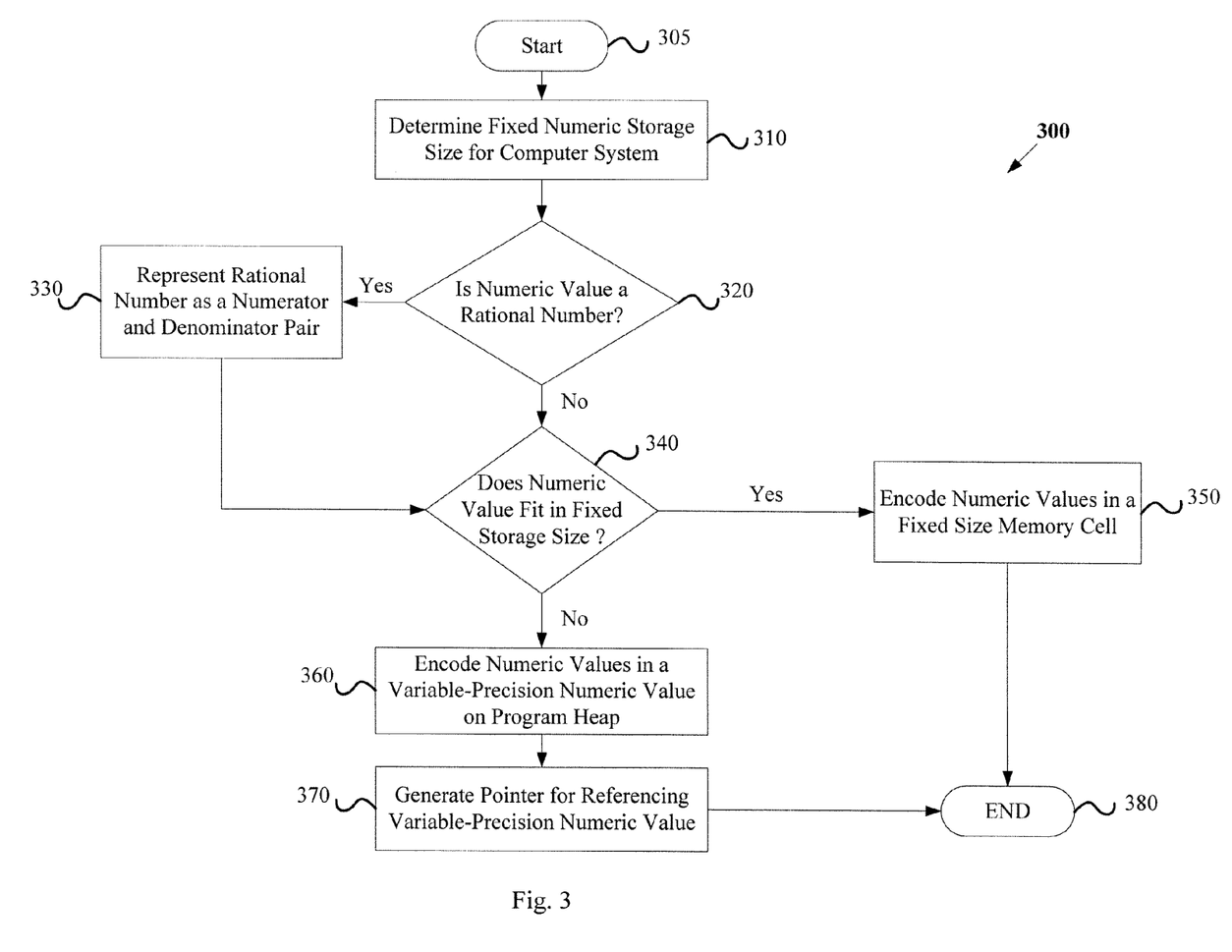
FIG. 3 depicts an additional optional methodology according to various embodiments of the present invention.

According to an embodiment of the present invention, FIG. 3 illustrates a flow chart 300 showing an exemplary method for determining a fixed numeric storage size for a computer system, determining what the fixed numeric storage size is for a computer system, determining whether a numeric value is a rational number, if it is a rational number expressing the rational numeric value as a pair including a numerator and a denominator, determining whether the numeric value fits in a fixed size memory cell, encoding the numeric value in a fixed size memory cell if it fits, encoding the numeric value in a variable-precision numeric value on the program heap and generating a reference for accessing the variable-precision numeric value.

According to one or more embodiments flow chart 300 may begin at block 305. At block 310 runtime software may determine the fixed numeric storage size for the computer. If the numeric value is a rational number as determined by block 320 then block 330 may represent the rational number as a numerator and denominator pair. Block 340 may determine whether the numeric value fits into the fixed numeric storage size. If the numeric value fits in the fixed storage size block 350 may encode it there. If the numeric value does not fit in the fixed numeric storage size, block 360 may encode it in a variable-precision numeric value on the program heap. A reference may be generated by block 370 to reference the allocated variable-precision numeric value on the heap. The flowchart ends at block 380.

Figure 4:
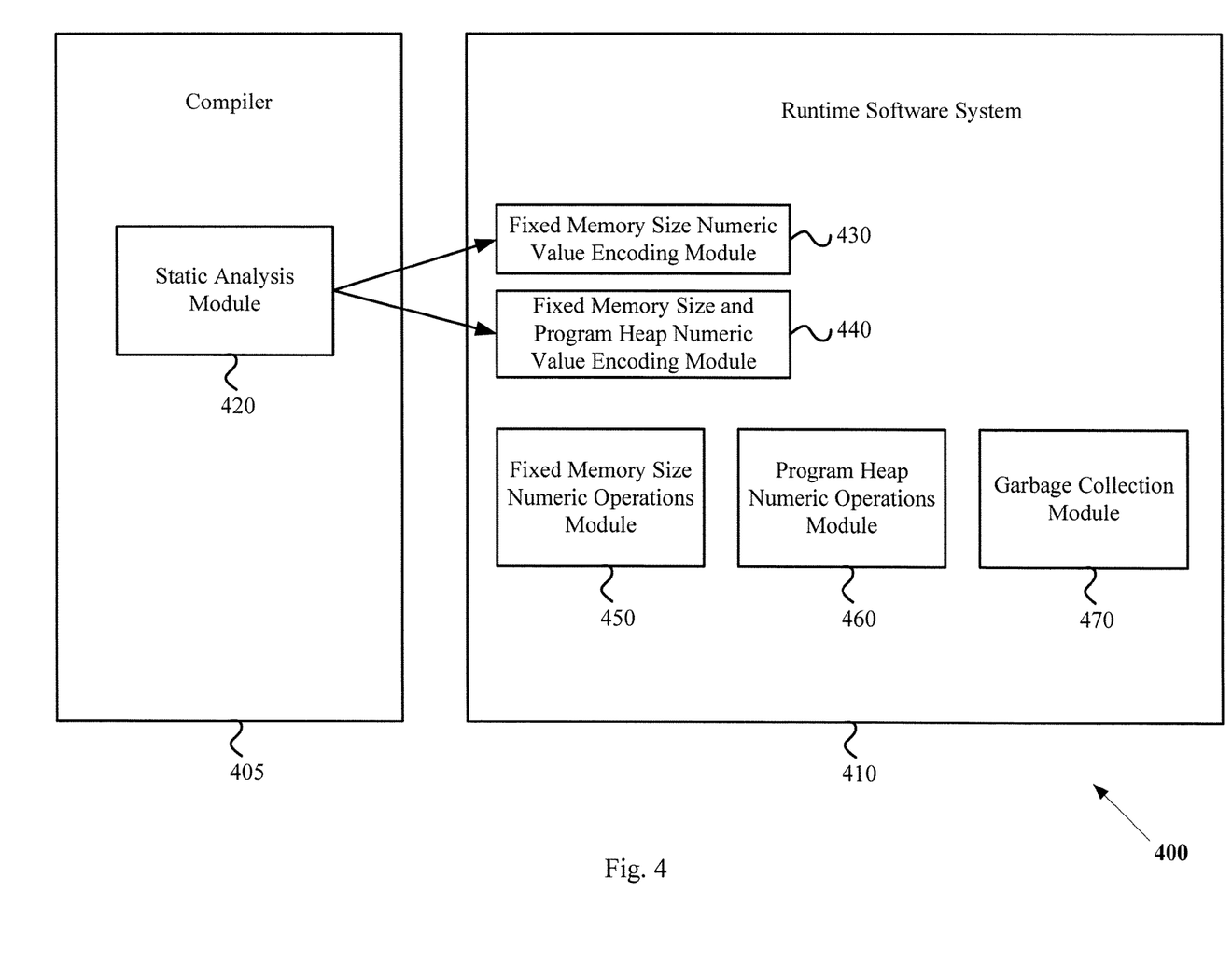
FIG. 4 depicts a schematic of a compiler and a runtime software system according to an embodiment of the present invention.

FIG. 4 depicts a system for encoding variable-precision numeric types according to one embodiment of the present invention. System 400 may comprise one or more of the following modules: static analysis module 420, fixed memory size numeric operations module 450, fixed memory size numeric value encoding module 430, fixed memory size and program heap numeric value encoding module 440, program heap numeric operations module 460 and garbage collection module 470.

Static analysis module 420 may enable the determination of the fixed numeric storage size used by the computer system and determining whether a numeric value fits into the fixed size. In some embodiments this may be performed by the compiler using static analysis. For example in a programming language where arrays are required to fit into the machine's available address space (e.g. a 32-bit address space), we are guaranteed that the array's elements can be indexed by fixed-size integer values (e.g. a 32-bit integers). An example in Java code is:

```
int sum(int[ ] elements)
{
    int result=0;
    for(int i=0; i<elements.length( ); i++)
        result = result + elements[i];
    return result;
}
```

In the above example, we could ensure that integer variable "i" is encoded as a numeric value that will fit in a fixed size memory cell. The compiler may thus safely deduce that "i" fits in a fixed size memory cell.

In some embodiments Static analysis module 420 may be implemented in a programming language whose type system encodes numeric bounds information into types and the compiler utilizes the bounds information in the type to determine whether a numeric value fits into the fixed size. For example, if a variable was defined with a size less than another data structure which is known to fit into machine's address space, then a compiler or the runtime software for such a programming language, could conservatively deduce that the variable would fit in fixed size memory cell.

Fixed memory size numeric operations module 450 may enable numeric operations for values stored in a fixed size memory cell. In some embodiments this may include efficiently operating directly on the values without allocating additional storage.

Fixed memory size numeric value encoding module 430 may enable encoding of numeric values which may be stored in fixed size memory cell.

Fixed memory size and program heap numeric value encoding module 440 may determine whether a value may be encoded in a fixed size memory cell or may encode numeric values that do not fit into the fixed size in a variable-precision numeric value allocated on a program heap and generate a reference to access the variable-precision numeric value on the program heap. Fixed memory size and program heap numeric encoding module 440 may set a flag in memory cells it encodes indicating whether the actual value is stored in the fixed size memory cell or a reference to the actual value on the program heap.

Program heap numeric operations module 460 may enable precise variable-precision arithmetic operations utilizing references for operations whose results do not fit into the fixed size memory cell.

Garbage collection module 470 may enable garbage collection to automatically reclaim memory allocated for variable-precision values.

Figure 5:
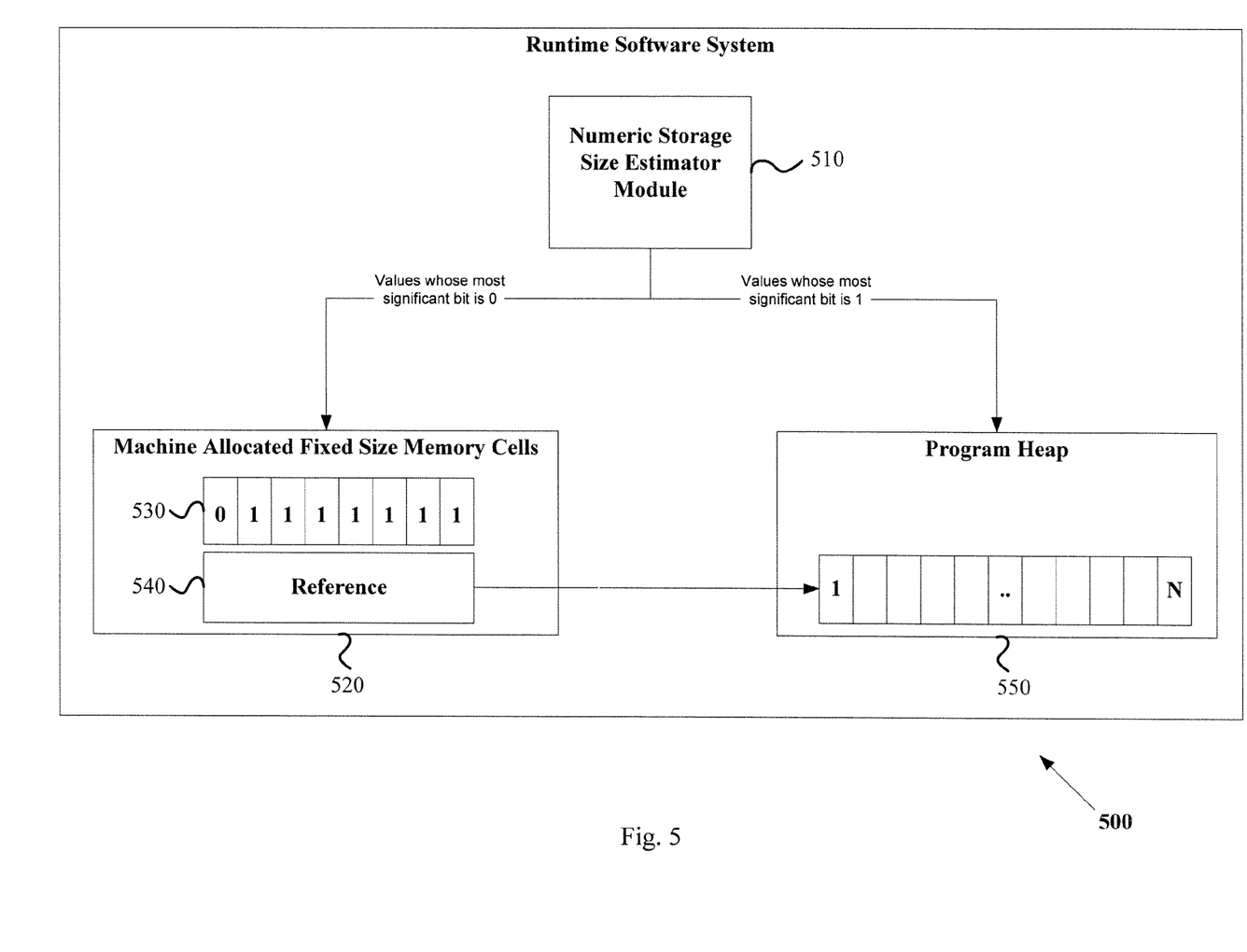
FIG. 5 depicts a schematic of a numeric value being stored in either a machine allocated fixed size memory cell or a variable size numeric type according to an embodiment of the invention.

FIG. 5 depicts a system for encoding variable-precision numeric types according to one embodiment of the present invention. System 500 may comprise one or more of the following modules: Numeric Storage Size Estimator Module 510, Machine Allocated Fixed Size Memory Cells 520, Fixed Size Number 530, Reference 540 and Program Heap 550.

Numeric storage size estimator module 510 may enable the determination of the fixed numeric storage size used by the computer system and the determination of whether a numeric value fits into the fixed size. In some embodiments this may be performed by the runtime software using static analysis. In some embodiments this may be implemented in a programming language whose type system encodes numeric bounds information into types and the runtime software utilizes the bounds information in the type to determine whether a numeric value fits into the fixed size. In some embodiments this may involve looking at the most significant bit (the bit position in a binary number having the greatest value, also referred to as the left-most bit) and determining if the most significant bit is 1 or 0.

Machine allocated fixed size memory cell 520 represents one possible implementation of the system on a underlying computer architecture that uses 8 bits of memory addressable space. In this possible implementation the largest literal integer that may be stored in the 8 bit machine allocated fixed size memory cell 530 is 127 represented in binary as "01111111". Numeric values of 128 or greater in an implementation of the system with an underlying computer architecture with 8 bits of memory address space have a most significant bit of 1 and a reference may be stored in a machine allocated fixed size memory cell 540 to access the actual value on the program heap in this possible implementation. In some implementations the reference stored in the fixed size memory cell may be a pointer.

Program Heap 550 represents one possible implementation of the system on a underlying computer architecture that uses 8 bits of memory addressable space. Numeric values of 128 or greater in an implementation of the system with an underlying computer architecture with 8 bits of memory addressable space have a most significant bit of 1 and may be stored in the program heap.

One implementation may involve storing the literal value in a fixed-size integer variable if the value can fit in the fixed size memory cell and leaving a variable length array initialized to NULL. If the value can not fit in the fixed size memory cell it would be stored in the variable length array and the integer variable would be set to 0. Code using the numeric value may first check the variable length array to see if it was NULL. If the variable length array is not NULL then the code accessing the numeric value may use the value stored in the variable length array. If the variable length array is NULL then the code accessing the numeric value may use the value stored in the integer variable.

An example implementation of this in Java is:

```
class MyInteger
{
    BigInt BigValue;      // Used if not NULL.
    int    LiteralValue;  // Used if BigValue is Null.
};
```

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method of encoding variable-precision numeric types comprising:
   determining a fixed numeric storage size used by a computer system;
   encoding numeric values that fit into the fixed size in a memory cell of the corresponding fixed size along with other encoding information;
   performing numeric operations directly on values stored in fixed size memory cells when the results also fit into the fixed size memory cell;
   encoding numeric values that do not fit into the fixed size in a variable-precision numeric value allocated on a program heap of the computer system; and
   generating a reference to access the variable-precision numeric value on the program heap.

2. The method of claim 1 further comprising:
   allocating no additional storage for the operations; and
   enabling numeric operations utilizing references for values that do not fit into the fixed size memory cell where the operations utilizing references enable variable-precision arithmetic operation.

3. The method of claim 1 further comprising:
   enabling numeric operations utilizing references for operations whose results do not fit into the fixed size memory cell where the operations utilizing references enable variable-precision arithmetic operation.

4. The method of claim 1 further comprising:
   encoding fixed-point numbers with a range of fractional precision that is specified statically; and
   the magnitude of the number has an unbounded range.

5. A system which encodes variable-precision numeric types for use with spatial positioning in a three dimensional programming environment comprising:
   a numeric value encoding module which encodes variable-precision numeric types representing positional information in a three dimensional programming environment by the method of claim 4.

6. The method of claim 1 further comprising:
   encoding floating-point numbers with a range of mantissa precision that is specified statically; and
   the exponent has an unbounded range.

7. A system which encodes variable-precision numeric types for use with spatial positioning in a three dimensional programming environment comprising:
   a numeric value encoding module which encodes variable-precision numeric types representing spatial positioning information in a three dimensional programming environment by the method of claim 6.

8. The method of claim 1 further comprising:
   encoding rational numbers as pairs of integer numerators and denominators.

9. The method of claim 1 further comprising:
   encoding rational numbers as pairs of natural number numerators and denominators.

10. The method of claim 1 wherein the encoding is performed in a language whose runtime software uses garbage collection to automatically reclaim memory allocated for the variable-precision numeric values.

11. The method of claim 1 further comprising:
    performing static analysis of possible values of numeric program values wherein the static analysis determines when a value may be stored into a fixed size memory cell.

12. The method of claim 11 wherein the static analysis is performed by the compiler.

13. The method of claim 11 wherein the static analysis is performed by the runtime software.

14. The method of claim 1 wherein encoding is performed in a programming language whose type system encodes numeric bounds information into types; and the type information is utilized to determine whether a value may be stored into a fixed size memory cell.

15. The method of claim 14 wherein the value storage determination is performed by the compiler.

16. The method of claim 14 wherein the value storage determination is performed by the runtime software.

17. A system which encodes variable-precision numeric types for use with cryptographic algorithms comprising:
    a numeric value encoding module which encodes variable-precision numeric types in cryptographic algorithms by the method of claim 1.

18. A programming language runtime component comprising:
    a variable-precision numeric type module providing a variable-precision numeric type for a programming language runtime by the method of claim 1.

19. The programming language runtime component of claim 18 wherein the variable-precision numeric type is the default data type for encoding natural numbers.

20. The programming language runtime component of claim 18 wherein the variable-precision numeric type is the default data type for encoding integers.

21. A system which encodes variable-precision numeric types for use with spatial positioning in a three dimensional programming environment comprising:
    a numeric value encoding module which encodes variable-precision numeric types representing spatial positioning information in a three dimensional programming environment by the method of claim 1.

22. A system which encodes variable-precision numeric types comprising:
    a numeric storage size estimator module which determines a fixed numeric storage size used by a computer system;
    a fixed memory size numeric operations module which encodes numeric values that fit into the fixed size in a memory cell of the corresponding fixed size along with other encoding information and performs numeric operations directly on values stored in fixed size memory cells when the results also fit into the fixed size memory cell;
    a program heap numeric value encoding module which encodes numeric values that do not fit into the fixed size in a variable-precision numeric value allocated on a program heap; and
    a reference generating module which generates a reference to point to the variable-precision numeric value on the program heap.

23. A system which encodes variable-precision numeric types comprising:
    a means of determining a fixed numeric storage size used by a computer system;
    a means of encoding numeric values that fit into the fixed size in a memory cell of the corresponding fixed size along with other encoding information;
    a means of performing numeric operations directly on values stored in fixed size memory cells when the results also fit into the fixed size memory cell;
    a means of encoding numeric values that do not fit into the fixed size in a variable-precision numeric value allocated on a program heap; and
    a means of generating a reference to point to the variable-precision numeric value on the program heap.

\* \* \* \* \*